J. L. SKUTTLE.
FLOAT VALVE.
APPLICATION FILED JUNE 10, 1920.

1,368,364. Patented Feb. 15, 1921.

Inventor:
John L. Skuttle

UNITED STATES PATENT OFFICE.

JOHN L. SKUTTLE, OF MASON CITY, IOWA.

FLOAT-VALVE.

1,368,364.

Specification of Letters Patent. Patented Feb. 15, 1921.

Application filed June 10, 1920. Serial No. 387,914.

*To all whom it may concern:*

Be it known that I, JOHN L. SKUTTLE, a citizen of the United States, and resident of Mason City, county of Cerro Gordo, and State of Iowa, have invented certain new and useful Improvements in Float-Valves, of which the following is a specification, and which are illustrated in the accompanying drawings, forming a part thereof.

This invention relates to float valves, and has for an object the provision of a device of this nature that will be convenient to assemble, which will be efficient in use, and which will be so simple as to not readily get out of order.

An illustrative embodiment of the invention is shown in the accompanying drawing, in which—

Figure 1:
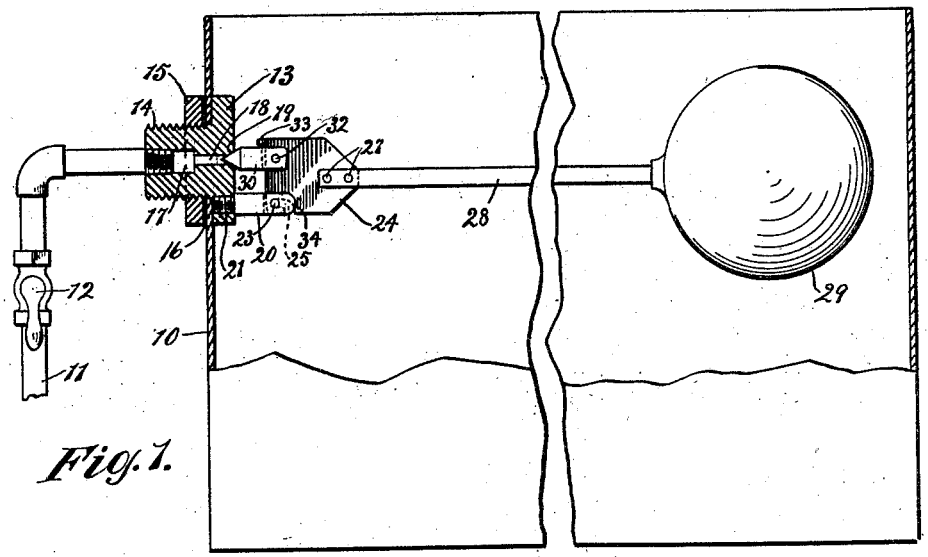
Figure 1 is a side elevation, partly in central vertical section.
Figure 2:
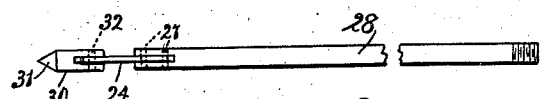
Figs. 2 and 4 are detail plan views.
Figures 3, 4:
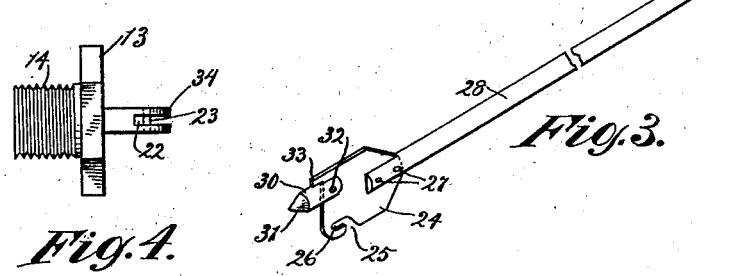
Fig. 3 is a detail perspective view.

A device embodying the invention may be used in any reservoir where it is desired to maintain a water level under consumption, but it is contemplated as being especially useful in flush tanks for lavatories and in humidifying tanks for hot air furnaces. In the drawings, 10 represents a tank of any kind fed by a water supply pipe 11, having a cut-off valve 12.

To secure the pipe 11 to the tank there is shown a valve casing head 13, having a threaded projecting portion 14 adapted to receive a lock nut 15. Preferably a gasket 16 is supplied to render the joint water tight. The portion 14 of the valve casing head is shown bored out at 17, and tapped for the reception of the supply pipe 11. A passage 18 may lead from the bore 17 and, as shown, may terminate in a valve seat, as 19, at the surface of the valve casing head.

It has been the practice, in some previous devices of the character of the present invention, to provide a recess in the valve casing head with the valve seat at the bottom of the recess. The reason for this was that the recess served as a guide for the plunger. Such structures, when used where the water was heated, as in humidifying reservoirs for hot air furnaces, were soon rendered inoperative by lime deposited in the recess. The present invention avoids this difficulty by placing the valve seat at the surface of the valve casing head and providing other means to guide the plunger, as explained below.

For attachment of a float and plunger to the valve casing head 13 there is shown a post 20, secured in a hole 21 in the head, said post being preferably slotted, as at 22, and a pivot pin 23 is passed through the walls of the slot to serve as a pivot for the float. To coact with the pivot pin 23 there is shown a plate 24, having a recess 25 opening to its lower side and extending upwardly and forwardly to a pivotal portion 26, adapted to coact with the pivot pin 23. Rigidly attached to the plate 24, as by rivets 27, there is shown a float rod 28, screw-threaded at its free extremity for reception of a float 29.

The valve plunger 30, having the conical extremity 31 for coaction with the valve seat 19, is shown as pivoted to the plate 24 at 32, as by a slot in the end of the plunger and a pin passing through the plunger and the plate 24. The plunger must be free for vertical movement, to some extent, in order that its point may keep in touch with the valve seat when the float 29 lowers. However, the necessary freedom of movement for this purpose would render the plunger liable to be thrown upward to an inoperative position by an inrush of water impinging on the lower side of the conical extremity 31. To prevent such action a finger 33, shown as formed of the metal of plate 24, may be provided.

The plunger 30 is thus guided by the lower side of the valve seat and by finger 33 as to vertical direction. In the normal operation of the valve water will be admitted immediately when the plunger 30 leaves its seat, and the float will not, therefore, be permitted to fall low enough at any time to completely withdraw the point of the plunger from the surface of the seat 19. As to horizontal direction, the plunger is guided by coaction of the plate 24 with the slots in post 20 and in the plunger itself. To make the slot 22 in the post 20 more efficient as a guide the end may be extended beyond the pivot pin 23, as at 34, if desired.

I claim as my invention—

1. In a float valve, in combination, a valve casing head having a passage formed with a valve seat flush with the exterior surface of said head, a post projecting from said head, a plate pivoted to said post for vertical movement in its own plane, a float rod secured to said plate, a float on said rod, a valve plunger pivoted to said plate, and a finger projecting from said plate adjacent said plunger to limit its upward movement about its pivot.

2. A float valve comprising, in combination, a valve casing head, a post projecting from said head having a slot in its free end, a pivot pin located in said slot, a plate having a recess opening to the lower edge thereof and extending inward and forward to an end adapted to coact with said pivot pin, a valve plunger pivoted upon said plate, and a float rod carrying a float secured to said plate.

JOHN L. SKUTTLE.